United States Patent
Morokuma

[11] Patent Number: 6,128,179
[45] Date of Patent: Oct. 3, 2000

[54] ALUMINUM ELECTROLYTIC CAPACITOR

[75] Inventor: Munehiro Morokuma, Neyagawa, Japan

[73] Assignee: Matsushita Electric Industrial Co., Ltd., Osaka, Japan

[21] Appl. No.: 09/266,799

[22] Filed: Mar. 12, 1999

[30]     Foreign Application Priority Data

Mar. 23, 1998    [JP]    Japan .................................. 10-073820

[51] Int. Cl.$^7$ .............................. H01G 2/10; H01G 9/10
[52] U.S. Cl. ......................... 361/517; 361/518; 361/519; 361/535; 361/536; 361/537; 29/25.03
[58] Field of Search ............................ 361/517, 518–519, 361/520, 530, 535–538, 540, 525, 503, 505, 504; 29/25.03; 252/62.2

[56]              References Cited

U.S. PATENT DOCUMENTS 5,847,919  12/1998  Shimizu ................................... 361/517

FOREIGN PATENT DOCUMENTS 62-264615  11/1987  Japan .
8-21527    3/1996   Japan .
WO 95/15572  8/1995  WIPO .

*Primary Examiner*—Kristine Kincaid
*Assistant Examiner*—Anthony Dinkins
*Attorney, Agent, or Firm*—McDermott, Will & Emery

[57]                ABSTRACT

The invention includes an electrolyte solution, a capacitor element impregnating the electrolyte solution, a case containing the capacitor element, a sealing member sealing the opening of the case, and lead wires coming out from the capacitor element and projecting outside by penetrating through the sealing member. The electrolyte solution contains a salt of carboxylic acid of quaternary matter of a compound containing N, N, N'-substitute amidine group and electrolyte. The electrolyte solution has γ-butyrolactone as solvent, and the electrolyte is dissolved in the solvent. The elastic polymer has a crosslinking elastic polymer material. The sealing member has a molded form formed by crosslinking a mixture containing the crosslinking polymer material, magnesium oxide and crosslinking agent. According to this invention, even in severe conditions of such as an atmosphere of high temperature and high humidity, leakage of electrolyte solution can be prevented. As a result, an aluminum electrolytic capacity of long life and high reliability is obtained.

14 Claims, 3 Drawing Sheets

ALUMINUM ELECTROLYTIC CAPACITOR

FIELD OF THE INVENTION

The present invention relates to an electrolytic capacitor, more particularly to an aluminum electrolytic capacitor enhanced in reliability by seeking the ultimate combination of sealing member and electrolyte solution.

BACKGROUND OF THE INVENTION

An aluminum electrolytic capacitor is composed of a capacitor element formed by winding an anode foil and a cathode foil through a separator, an electrolyte solution for driving impregnating this capacitor element, a metal case containing this capacitor element, and an elastic sealing member sealing the metal case.

As the electrolyte solution for driving, various electrolyte solutions are used depending on the required performance of the aluminum electrolytic capacitor. In the case of requirement of reliability of aluminum electrolytic capacitor at high temperature and high humidity, the electrolyte for driving having a high electric conductivity and an excellent thermal stability is required. The electrolyte solution used in the aluminum electrolytic capacitor is disclosed in Japanese Laid-open Patent No. 62-264615 and Reopened International Patent Publication No. WO95/15572. Japanese Laid-open Patent No. 62-264615 describes a solvent such as N, N-dimethyl formamide (DMF) or γ-butyrolactone (GBL), a base component of tetralkyl ammonium dissolved in the solvent, and a solute such as quaternary ammonium salt containing carboxylic acid as acid component. Reopened International Patent Publication No. WO95/15572 describes a base component containing alkyl substitute amidine group, and a solute such as amidine salt containing carboxylic acid as acid component.

In order to satisfy the reliability of aluminum electrolytic capacitor by sealing a highly volatile DMF of GBL, as an elastic sealing member, it is known to use crosslinking rubber having a high air tightness and heat resistance. Known examples of such crosslinking rubber include crosslinking rubber having a three-component copolymer of isobutylene, isoprene and divinyl benzene vulcanized by peroxide (IIR-Po) and crosslinking rubber having a copolymer of isobutylene and isoprene vulcanized by using resin as polymer (IIR-Re).

The conventional aluminum electrolytic capacitors has a common problem, that is, the electrolyte solution for driving leaks from around the through-hole of the lead wire of the sealing member. To prevent leak from the through-hole of the lead wire, as disclosed in Japanese Patent Publication No. 8-21527, it is proposed to use, as the elastic sealing member, crosslinking rubber prepared by blending a principal polymer such as three-component copolymer of isobutylene, isoprene and divinyl benzene with at least magnesium oxide, and vulcanizing by peroxide.

In an aluminum electrolytic capacitor using an electrolyte solution for driving containing γ-butyrolactone as solvent and quaternary ammonium salt of organic acid as solute, in the case of electrolytic capacitor comprising a sealing member using this crosslinking rubber blending magnesium oxide, as compared with the aluminum electrolytic capacitor using conventional crosslinking rubber (IIR-Po), leak from around the through-hole of the lead wire of the sealing member at high temperature is improved, but in severe environments of high temperature and high humidity, it is found to have a new problem, that is, the electrolyte solution for driving exudes from around the through-hole of the lead wire of the sealing member.

It is hence an object of the invention to present an aluminum electrolytic capacitor of high reliability free from leak from around the through-hole of the lead wire of the sealing member in severe environments of high temperature and high humidity.

SUMMARY OF THE INVENTION

The aluminum electrolytic capacitor of the invention comprises an electrolyte solution, a capacitor element impregnating the electrolyte solution, a case containing the capacitor element, a sealing member sealing the opening of the case, and lead wires coming out from the capacitor element and projecting outside by penetrating through the sealing member. The sealing member is fabricated of a composite material containing elastic polymer and magnesium oxide dispersed in the elastic polymer, and the electrolyte solution contains a salt of quaternary matter of a compound containing N, N, N'-substitute amidine group and acid compound.

More preferably, the electrolyte solution has γ-butyrolactone as solvent, and the salt plays the role of electrolyte solution and is dissolved in the solvent.

More preferably, the acid compound salt is carboxylic acid.

According to this constitution, in severe environments such as atmosphere of high temperature and high humidity, leak of electrolyte solution from around the through-hole of the lead wire can be suppressed. As a result, an aluminum electrolytic capacitor having a long life and an excellent reliability is obtained.

REFERENCE NUMERALS

Figure 1:
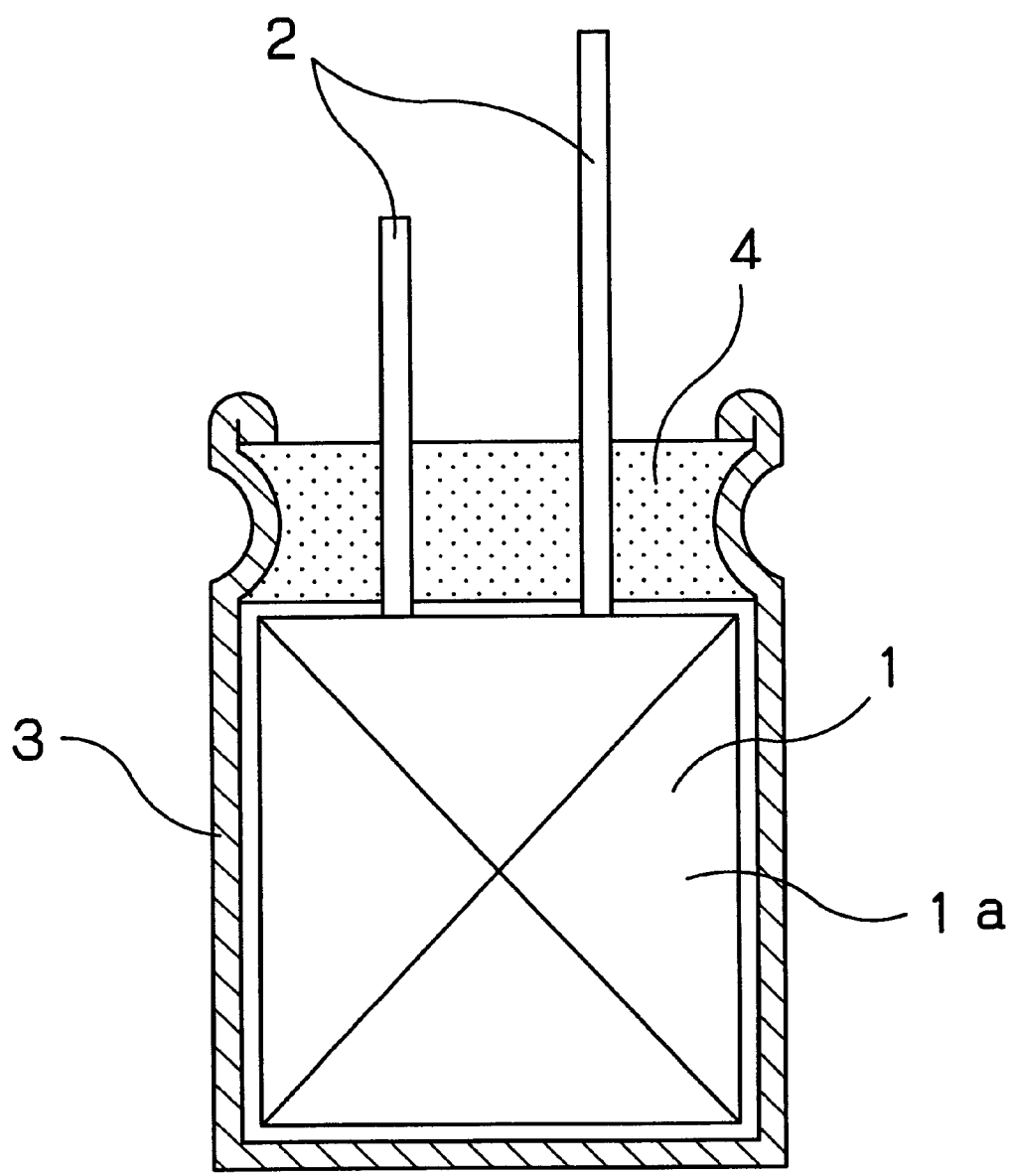
FIG. 1 is a front sectional view of an aluminum electrolytic capacitor in an embodiment of the invention.

1 Capacitor element
1a Electrolyte
2 Lead wire
3 Case
4 Sealing member

DETAILED DESCRIPTION OF THE INVENTION

The invention comprises, in an aspect thereof, a capacitor element impregnating electrolyte solution for driving, a tubular case with a bottom for containing this capacitor element, a sealing member sealing the opening of this case, and a pair of lead wires coming out from the capacitor element and projecting outside by penetrating through the sealing member. The sealing member is a composite material vulcanizing and forming a mixed material composed of 100 parts by weight of elastic polymer, 50 to 200 parts by weight of filler, 10 to 80 parts by weight of reinforcing agent, 0.1 to 10 parts by weight of vulcanizing agent, and 1 to 10 parts by weight of magnesium oxide. The electrolyte solution for driving comprises a main solvent such as γ-butyrolactone, and an electrolyte such as salt of carboxylic acid of quaternary matter of a compound having N, N, N'-substitute amidine group. The electrolyte is dissolved in the solvent. This constitution realizes an electrolytic capacitor having an excellent reliability by preventing leak from around the through-hole of the lead wire of the sealing member even in severe environments of high temperature and high humidity.

Preferably, as the elastic polymer, a three-component copolymer of isobutylene, isoprene and divinyl benzene, or a copolymer of isobutylene and isoprene is used. Such copolymers are crosslinking polymer materials. By this constitution, a sealing member having an extremely excellent air tightness and a high heat resistance is obtained, and an electrolytic capacitor having the extremely excellent effects is realized.

Preferably, the sealing member is formed of a mixed material containing a crosslinking aid. By this constitution, the crosslinking reaction of the elastic polymer is promoted, and the crosslinking density is enhanced, so that an electrolytic capacitor having the extremely excellent effects is obtained.

Preferably, the sealing member is formed of a mixed material containing a processing aid. By this constitution, when forming the sealing member, processability is improved, and an electrolytic capacitor having the stable effects is obtained.

Preferably, the sealing member is formed of a mixed material containing an aging retardant. By this constitution, deterioration of the sealing member is extremely suppressed, and an electrolytic capacitor having the stable effects for a long period is obtained.

Preferably, the sealing member has a molded matter crosslinked by the use of peroxide crosslinking agent or resin crosslinking agent in vulcanization and forming. By using such crosslinked molded matter, the crosslinking reaction can be progressed rapidly, and the crosslinking density is enhanced.

As the quaternary matter salt of a compound containing N, N, N'-substitute amidine group, for example, a salt compound of a quaternary matter of a compound containing N, N, N'-substitute amidine group expressed in formula (1) or formula (2), and an acid compound forming an anion may be used.

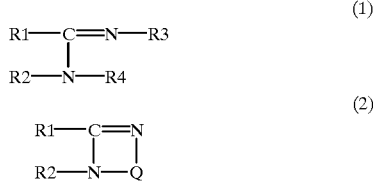

In formula (1) and formula (2), R1, R2, R3, and R4 are amino group, nitro group, cyano group, carboxyl group, ether group, aldehyde group, alkyl group, hydroxide group, or cyclic group, and Q contains hydrocarbon group, amino group, nitro group, cyano group, carboxyl group, ether group, aldehyde group, etc.

Examples of the quaternary matter of a compound containing N, N, N'-substitute amidine group include methyl imidazole, dimethyl imidazole, dimethyl-ethyl imidazole, methyl benzoimidazole, dimethyl imidazoline, trimethyl imidazoline, dimethyl-ethyl imidazoline, dimethyl-tetrahydropyrimidine, diazabicycloundecene, and diazabicyclononene.

As the salt of quaternary matter, organic acids such as carboxylic acid, phosphoric acid, and ester alkyl phosphate may be used. Examples of carboxylic acid include polycarboxylic acid, aliphatic polycarboxylic acids (oxalic acid, malonic acid, succinic acid, adipic acid), unsaturated carboxylic acids (phthalic acid, maleic acid), alicyclic polycarboxylic acid (cyclohexane-1,2-dicarboxylic acid, cyclohexene-1,2-dicarboxylic acid), and aromatic carboxylic acids (benzoic acid, etc.).

As the reinforcing agent, known reinforcing agents may be used, such as carbon black or white carbon (silica fine powder).

As the filler, known fillers may be used, such as silica powder, calcium carbonate powder, talc powder, mica powder, glass fiber powder, graphite, or aluminum silicate.

As the vulcanizing agent or crosslinking agent, peroxides are used, such as dicumyl peroxide, t-butyl peroxide, or benzoyl peroxide. These peroxides activate the elastic polymer, and crosslink the elastic polymer to form a crosslinked composite material.

As other vulcanizing agent or crosslinking agent, resin crosslinking agents are used, such as alkyl phenol formaldehyde resin and octyl phenol aldehyde resin. These resin crosslinking agents crosslink and react with the elastic polymer, and produce a crosslinked composite material.

As the solvent, the γ-butyrolactone is used as the main solvent, and a subsidiary solvent may be added to the main solvent. As such subsidiary solvent, other organic solvent compatible with the γ-butyrolactone is used. Such examples of subsidiary solvent include polyhydric alcohol, lactone solvent, amide solvent, ether solvent, nitrile solvent, furan solvent, and imidazoline dinone solvent.

As the crosslinking aid, zinc oxide, calcium hydroxide, lead monoxide and others may be used.

As the processing aid, stearic acid, zinc stearate, oleic acid and others may be used.

As the aging retardant, alkyl phenol and other phenolic aging retardant, phenyl naphthyl amine and other amine aging retardant, sulfur compounds, phosphorus compounds and others may be used.

In the invention, the vulcanizing agent and crosslinking agent are the same.

Representative embodiments of the invention are described below while referring to the drawings.

A front sectional view of an aluminum electrolytic capacitor in a representative embodiment of the invention is shown in FIG. 1. In FIG. 1, the aluminum electrolytic capacitor comprises a capacitor element 1 contained in a case 3, lead wires 2 connected to the capacitor element 1, and a sealing member 4 for sealing the opening of the case 3. The capacitor element 1 is formed by winding an anode foil and a cathode foil through a separator. The capacitor element 1 contains an impregnated electrolyte solution for driving 1a. The sealing member 4 is formed of an elastic material, and has a pair of through-holes. The lead wires 2 are a pair of lead wires connected to each end of the anode foil and cathode foil, and each one of the pair of lead wires 2 penetrates the through-hole of the sealing member 4 and is drawn outside of the case 3. The case 3 is a tubular metal having a bottom. The lead wires 2 are in tight contact with the through-hole. That is, the lead wires 2 contact tightly with the sealing member 4, and the junction of the lead wires 2 and sealing member 4 is sealed, so that leak of electrolyte solution from this junction is prevented.

Various embodiments of the invention and comparative examples are described below.

EXEMPLARY EMBODIMENT 1

A mixture comprising 100 parts by weight of elastic polymer composed of a three-component copolymer of isobutylene, isoprene and divinyl benzene, 0.5 part by weight of magnesium oxide, carbon black as reinforcing agent, filler, crosslinking aid, processing aid, and aging retardant is formed by using 3 parts by weight of dicumyl peroxide as peroxide crosslinking agent, and a crosslinked composite material is prepared. The crosslinked composite material is formed by the action of the copolymer and peroxide crosslinking agent by heating the mixture. Using the obtained composite material, a sealing member 4 was fabricated. At the time of forming, meanwhile, the sealing member 4 may be also fabricated directly. As the main solvent, γ-butyrolactone was used. As the carboxylate of quaternary matter of a compound having N, N, N'-substitute amidine group as the solute and electrolyte, phthalic acid 1,2,3,4-tetramethyl imidazolinium was used. The electrolyte was dissolved in the solvent. Thus, an electrolyte solution for driving 1a (hereinafter called electrolyte solution) was prepared. Using thus obtained sealing member 4 and electrolyte solution 1a, an aluminum electrolytic capacitor as shown in FIG. 1 was fabricated.

EXEMPLARY EMBODIMENT 2

A sealing member was fabricated in the same manufacturing method as in embodiment 1, by using the same mixture as in embodiment 1 except that the content of magnesium oxide was 1 part by weight. Using this sealing member, an aluminum electrolytic capacitor as shown in FIG. 1 was fabricated in the same manner as in embodiment 1.

EXEMPLARY EMBODIMENT 3

A sealing member was fabricated in the same manufacturing method as in embodiment 1, by using the same mixture as in embodiment 1 except that the content of magnesium oxide was 3 parts by weight. Using this sealing member, an aluminum electrolytic capacitor as shown in FIG. 1 was fabricated in the same manner as in embodiment 1.

EXEMPLARY EMBODIMENT 4

A sealing member was fabricated in the same manufacturing method as in embodiment 1, by using the same mixture as in embodiment 1 except that the content of magnesium oxide was 4 parts by weight. Using this sealing member, an aluminum electrolytic capacitor as shown in FIG. 1 was fabricated in the same manner as in embodiment 1.

EXEMPLARY EMBODIMENT 5

A sealing member was fabricated in the same manufacturing method as in embodiment 1, by using the same mixture as in embodiment 1 except that the content of magnesium oxide was 5 parts by weight. Using this sealing member, an aluminum electrolytic capacitor as shown in FIG. 1 was fabricated in the same manner as in embodiment 1.

EXEMPLARY EMBODIMENT 6

A sealing member was fabricated in the same manufacturing method as in embodiment 1, by using the same mixture as in embodiment 1 except that the content of magnesium oxide was 10 parts by weight. Using this sealing member, an aluminum electrolytic capacitor as shown in FIG. 1 was fabricated in the same manner as in embodiment 1.

EXEMPLARY EMBODIMENT 7

A sealing member was fabricated in the same manufacturing method as in embodiment 1, by using the same mixture as in embodiment 1 except that the content of magnesium oxide was 20 parts by weight. Using this sealing member, an aluminum electrolytic capacitor as shown in FIG. 1 was fabricated in the same manner as in embodiment 1.

EXEMPLARY EMBODIMENT 8

A mixture comprising 100 parts by weight of elastic polymer composed of a two-component copolymer of isobutylene and isoprene and 4 parts by weight of magnesium oxide was vulcanized with resin by using alkyl phenol formaldehyde resin, and a crosslinked composite material was prepared. Using the obtained composite material, a sealing member 4 was fabricated. As the main solvent, γ-butyrolactone was used, and in this main solvent, carboxylate of quaternary matter of a compound having N, N, N'-substitute amidine group as the solute was dissolved. Thus, an electrolyte solution 1a was prepared. Using thus obtained sealing member 4 and electrolyte solution 1a, an aluminum electrolytic capacitor as shown in FIG. 1 was fabricated.

EXEMPLARY EMBODIMENT 9

A mixture comprising 100 parts by weight of elastic polymer composed of a three-component copolymer of isobutylene, isoprene and divinyl benzene and 4 parts by weight of magnesium oxide was vulcanized with resin by using alkyl phenol formaldehyde resin, and a crosslinked composite material was prepared. Using the obtained composite material, a sealing member 4 was fabricated. As the main solvent, γ-butyrolactone was used, and in this main solvent, carboxylate of quaternary matter of a compound having N, N, N'-substitute amidine group as the solute was dissolved. Thus, an electrolyte solution 1a was prepared. Using thus obtained sealing member 4 and electrolyte solution 1a, an aluminum electrolytic capacitor as shown in FIG. 1 was fabricated.

EXEMPLARY EMBODIMENT 10

A mixture comprising 100 parts by weight of elastic polymer composed of a two-component copolymer of isobutylene and isoprene and 1 part by weight of magnesium oxide was vulcanized with peroxide by using dicumyl peroxide, and a crosslinked composite material was prepared. Using the obtained composite material, a sealing member 4 was fabricated. As the main solvent, γ-butyrolactone was used, and in this main solvent, carboxylate of quaternary matter of a compound having N, N, N'-substitute amidine group as the solute was dissolved. Thus, an electrolyte solution 1a was prepared. Using thus obtained sealing member 4 and electrolyte solution 1a, an aluminum electrolytic capacitor as shown in FIG. 1 was fabricated.

EXEMPLARY EMBODIMENT 11

A sealing member was fabricated in the same manufacturing method as in embodiment 10, by using the same mixture as in embodiment 10 except that the content of magnesium oxide was 10 parts by weight. Using this sealing member, an aluminum electrolytic capacitor as shown in FIG. 1 was fabricated in the same manner as in embodiment 10.

EXEMPLARY EMBODIMENT 12

A mixture comprising 100 parts by weight of elastic polymer composed of a three-component copolymer of isobutylene, isoprene and divinyl benzene, 1 part by weight of magnesium oxide, 10 parts by weight of carbon black as reinforcing agent, 50 parts by weight of filler, and 0.1 part by weight of peroxide as vulcanizing agent was crosslinked, and a crosslinked composite material was prepared. Using the obtained composite material, a sealing member 4 was fabricated. As the main solvent, γ-butyrolactone was used, and in this main solvent, carboxylate of quaternary matter of a compound having N, N, N'-substitute amidine group as the solute was dissolved. Thus, an electrolyte solution 1a was prepared. Using thus obtained sealing member 4 and electrolyte solution 1a, an aluminum electrolytic capacitor as shown in FIG. 1 was fabricated.

EXEMPLARY EMBODIMENT 13

A mixture comprising 100 parts by weight of elastic polymer composed of a three-component copolymer of isobutylene, isoprene and divinyl benzene, 6 parts by weight of magnesium oxide, 40 parts by weight of carbon black as reinforcing agent, 100 parts by weight of filler, and 10 parts by weight of alkyl phenol formaldehyde resin as vulcanizing agent was crosslinked, and a crosslinked composite material was prepared. Using the obtained composite material, a sealing member 4 was fabricated. As the main solvent, γ-butyrolactone was used, and in this main solvent, carboxylate of quaternary matter of a compound having N, N, N'-substitute amidine group as the solute was dissolved. Thus, an electrolyte solution 1a was prepared. Using thus obtained sealing member 4 and electrolyte solution 1a, an aluminum electrolytic capacitor as shown in FIG. 1 was fabricated.

EXEMPLARY EMBODIMENT 14

A mixture comprising 100 parts by weight of elastic polymer composed of a two-component copolymer of isobutylene and isoprene, 1 part by weight of magnesium oxide, 10 parts by weight of carbon black as reinforcing agent, 50 parts by weight of filler, and 0.1 part by weight of peroxide as vulcanizing agent was crosslinked, and a crosslinked composite material was prepared. Using the obtained composite material, a sealing member 4 was fabricated. As the main solvent, γ-butyrolactone was used, and in this main solvent, quaternary salt of a compound having N, N, N'-substitute amidine group as the solute was dissolved. Thus, an electrolyte solution 1a was prepared. Using thus obtained sealing member 4 and electrolyte solution 1a, an aluminum electrolytic capacitor as shown in FIG. 1 was fabricated.

EXEMPLARY EMBODIMENT 15

A mixture comprising 100 parts by weight of elastic polymer composed of a two-component copolymer of isobutylene and isoprene, 6 parts by weight of magnesium oxide, 40 parts by weight of carbon black as reinforcing agent, 100 parts by weight of filler, and 10 parts by weight of alkyl phenol formaldehyde resin as vulcanizing agent was crosslinked, and a crosslinked composite material was prepared. Using the obtained composite material, a sealing member 4 was fabricated. As the main solvent, γ-butyrolactone was used, and in this main solvent, quaternary salt of a compound having N, N, N'-substitute amidine group as the solute was dissolved. Thus, an electrolyte solution 1a was prepared. Using thus obtained sealing member 4 and electrolyte solution 1a, an aluminum electrolytic capacitor as shown in FIG. 1 was fabricated.

EXEMPLARY EMBODIMENT 16

A mixture comprising 100 parts by weight of elastic polymer composed of a two-component copolymer of isobutylene and isoprene, 10 parts by weight of magnesium oxide, 80 parts by weight of carbon black as reinforcing agent, 200 parts by weight of filler, 3 parts by weight of peroxide as vulcanizing agent, crosslinking aid, processing aid, and aging retarder was crosslinked, and a crosslinked composite material was prepared. Using the obtained composite material, a sealing member 4 was fabricated. As the main solvent, γ-butyrolactone was used, and in this main solvent, carboxylate of quaternary matter of a compound having N, N, N'-substitute amidine group as the solute was dissolved. Thus, an electrolyte solution 1a was prepared. Using thus obtained sealing member 4 and electrolyte solution 1a, an aluminum electrolytic capacitor as shown in FIG. 1 was fabricated.

EXEMPLARY EMBODIMENT 17

A sealing member was fabricated in the same manufacturing method as in embodiment 10, by using the same mixture as in embodiment 10 except that the content of magnesium oxide was 0.5 part by weight. Using this sealing member, an aluminum electrolytic capacitor as shown in FIG. 1 was fabricated in the same manner as in embodiment 10.

EXEMPLARY EMBODIMENT 18

A sealing member was fabricated in the same manufacturing method as in embodiment 10, by using the same mixture as in embodiment 10 except that the content of magnesium oxide was 20 parts by weight. Using this sealing member, an aluminum electrolytic capacitor as shown in FIG. 1 was fabricated in the same manner as in embodiment 10.

COMPARATIVE EXAMPLE 1

A sealing member was fabricated in the same manufacturing method as in embodiment 1, by using the same mixture as in embodiment 1 except that magnesium oxide was not contained. Further, as the solute, instead of carboxylate of quaternary matter of a compound having N, N, N'-substitute amidine group, quaternary ammonium salt of organic acid was used. Using this sealing member and quaternary ammonium salt of organic acid as electrolyte, an aluminum electrolytic capacitor as shown in FIG. 1 was fabricated in the same manner as in embodiment 1.

COMPARATIVE EXAMPLE 2

A sealing member was fabricated in the same manufacturing method as in embodiment 1, by using the same mixture as in embodiment 1 except that the content of magnesium oxide was 4 parts by weight. Further, as the solute, instead of carboxylate of quaternary matter of a compound having N, N, N'-substitute amidine group, quaternary ammonium salt of organic acid was used. Using this sealing member and quaternary ammonium salt of organic acid as electrolyte, an aluminum electrolytic capacitor as shown in FIG. 1 was fabricated in the same manner as in embodiment 1.

COMPARATIVE EXAMPLE 3

A sealing member was fabricated in the same manufacturing method as in embodiment 8, by using the same mixture as in embodiment 8 except that magnesium oxide was not contained. Further, as the solute, instead of carboxylate of quaternary matter of a compound having N, N, N'-substitute amidine group, quaternary ammonium salt of organic acid was used. Using this sealing member and quaternary ammonium salt of organic acid as electrolyte, an aluminum electrolytic capacitor as shown in FIG. 1 was fabricated in the same manner as in embodiment 8.

COMPARATIVE EXAMPLE 4

A sealing member was fabricated in the same manufacturing method as in embodiment 8, by using the same mixture as in embodiment 8 except that the content of magnesium oxide was 4 parts by weight. Further, as the solute, instead of carboxylate of quaternary matter of a compound having N, N, N'-substitute amidine group, quaternary ammonium salt of organic acid was used. Using this sealing member and quaternary ammonium salt of organic acid as electrolyte, an aluminum electrolytic capacitor as shown in FIG. 1 was fabricated in the same manner as in embodiment 8.

COMPARATIVE EXAMPLE 5

A sealing member was fabricated in the same manufacturing method as in embodiment 9, by using the same mixture as in embodiment 9 except that magnesium oxide was not contained. Further, as the solute, instead of carboxylate of quaternary matter of a compound having N, N, N'-substitute amidine group, quaternary ammonium salt of organic acid was used. Using this sealing member and quaternary ammonium salt of organic acid as electrolyte, an aluminum electrolytic capacitor as shown in FIG. 1 was fabricated in the same manner as in embodiment 9.

COMPARATIVE EXAMPLE 6

A sealing member was fabricated in the same manufacturing method as in embodiment 9, by using the same mixture as in embodiment 9 except that the content of magnesium oxide was 4 parts by weight. Further, as the solute, instead of carboxylate of quaternary matter of a compound having N, N, N'-substitute amidine group, quaternary ammonium salt of organic acid was used. Using this sealing member and quaternary ammonium salt of organic acid as electrolyte, an aluminum electrolytic capacitor as shown in FIG. 1 was fabricated in the same manner as in embodiment 9.

COMPARATIVE EXAMPLE 7

A sealing member was fabricated in the same manufacturing method as in embodiment 11, by using the same mixture as in embodiment 11 except that magnesium oxide was not contained. Further, as the solute, instead of carboxylate of quaternary matter of a compound having N, N, N'-substitute amidine group, quaternary ammonium salt of organic acid was used. Using this sealing member and quaternary ammonium salt of organic acid as electrolyte, an aluminum electrolytic capacitor as shown in FIG. 1 was fabricated in the same manner as in embodiment 11.

COMPARATIVE EXAMPLE 8

A sealing member was fabricated in the same manufacturing method as in embodiment 11, by using the same mixture as in embodiment 11 except that the content of magnesium oxide was 10 parts by weight. Further, as the solute, instead of carboxylate of quaternary matter of a compound having N, N, N'-substitute amidine group, quaternary ammonium salt of organic acid was used. Using this sealing member and quaternary ammonium salt of organic acid as electrolyte, an aluminum electrolytic capacitor as shown in FIG. 1 was fabricated in the same manner as in embodiment 11.

COMPARATIVE EXAMPLE 9

A sealing member was fabricated in the same manufacturing method as in embodiment 13, by using the same mixture as in embodiment 13 except that magnesium oxide was not contained. Further, as the solute, instead of carboxylate of quaternary matter of a compound having N, N, N'-substitute amidine group, quaternary ammonium salt of organic acid was used. Using this sealing member and quaternary ammonium salt of organic acid as electrolyte, an aluminum electrolytic capacitor as shown in FIG. 1 was fabricated in the same manner as in embodiment 13.

COMPARATIVE EXAMPLE 10

A sealing member was fabricated in the same manufacturing method as in embodiment 13, by using the same mixture as in embodiment 13 except that the content of magnesium oxide was 6 parts by weight. Further, as the solute, instead of carboxylate of quaternary matter of a compound having N, N, N'-substitute amidine group, quaternary ammonium salt of organic acid was used. Using this sealing member and quaternary ammonium salt of organic acid as electrolyte, an aluminum electrolytic capacitor as shown in FIG. 1 was fabricated in the same manner as in embodiment 13.

Using 10 aluminum electrolytic capacitors each obtained from embodiment 1 to embodiment 18 and comparative example 1 to comparative example 10, presence or absence of electrolyte leak in environments of high temperature and high humidity was investigated. That is, putting 10 samples each in the high temperature and high humidity atmosphere of 60° C. and 90% RH, while applying a voltage of −1.5 V, the samples were tested for 2000 hours. The number of electrolytic capacitors causing electrolyte leaks was counted. Results are shown in Table 1 and Table 2.

Moreover, in the sealing members fabricated in embodiment 1 to embodiment 7, and comparative example 1, the tensile strength and elongation were measured in terms of the content of magnesium oxide. Results are shown in Table 3.

Figure 2:
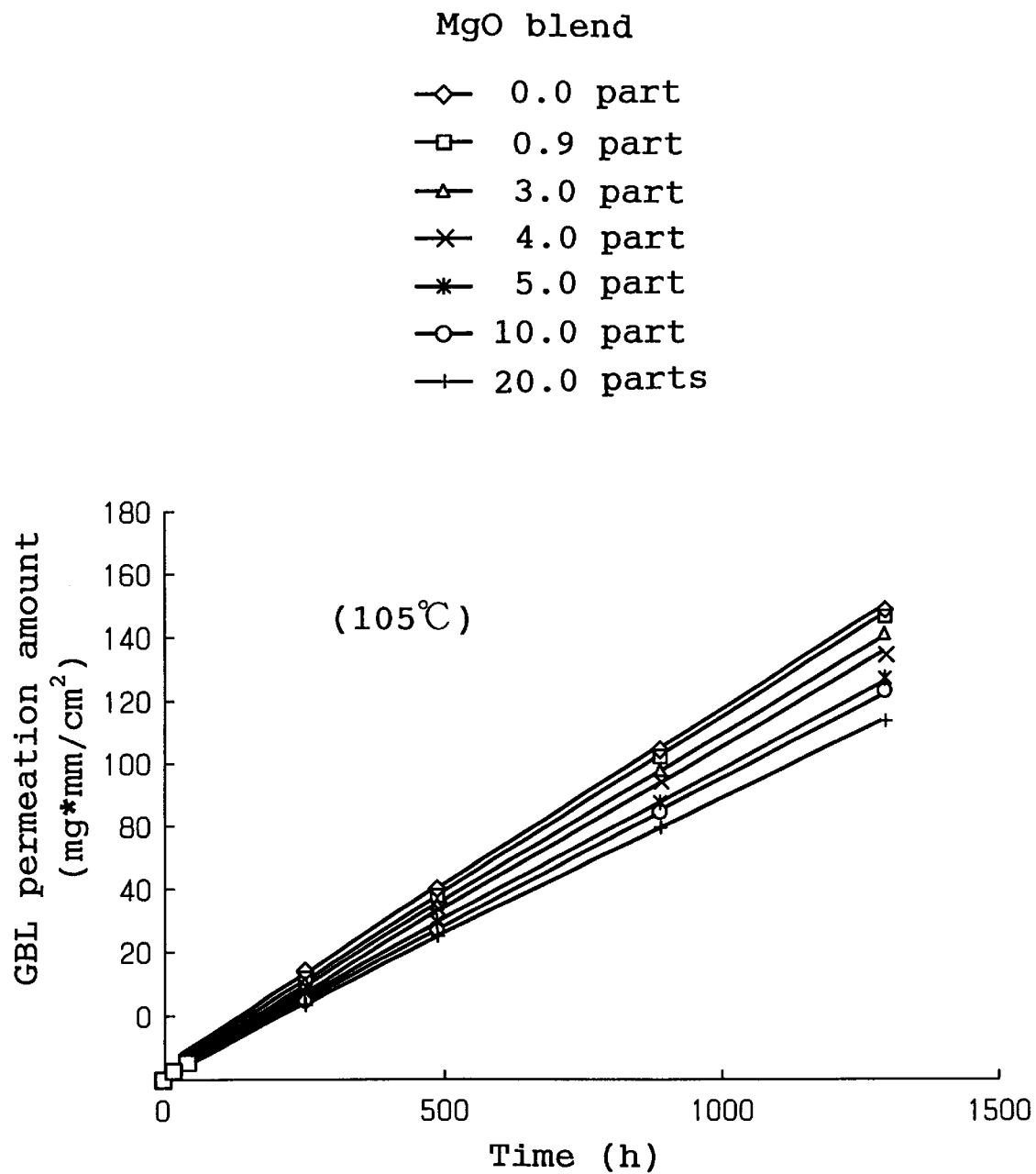
FIG. 2 is a characteristic diagram showing the relation between the content of magnesium oxide used in the sealing member and permeation changes of solvent.

Also in the sealing members fabricated in embodiment 1 to embodiment 7, and comparative example 1, the relation between the content of magnesium oxide and permeation amount of butyrolactone solvent (GBL) was measured. Results are shown in FIG. 2.

Figure 3:
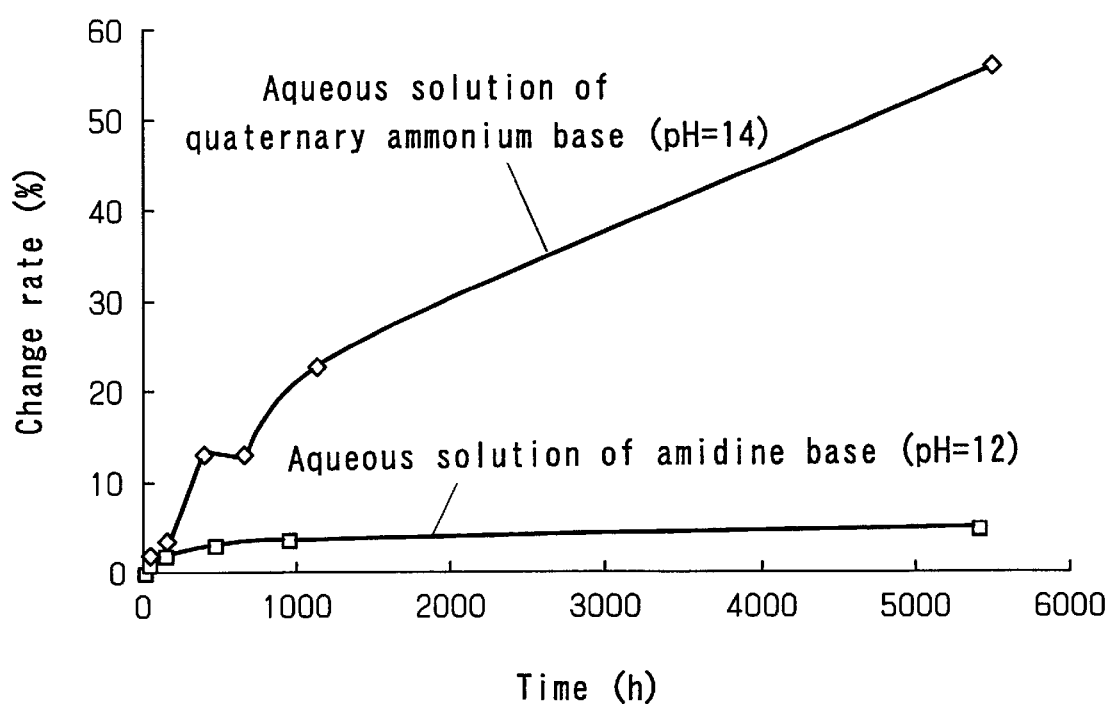
FIG. 3 is a characteristic diagram showing changes in invasion of two kinds of alkaline aqueous solutions into the rubber material used as sealing member.

Using the sealing member fabricated in embodiment 5, the weight change rate in aqueous solution was measured in the aqueous solution of carboxylate of quaternary matter of a compound having N, N, N'-substitute amidine group and aqueous solution of quaternary ammonium of carboxylic acid. Results are shown in FIG. 3.

TABLE 1

| Sample | Composition of sealing member | | | Electrolyte solution | | Test result |
|---|---|---|---|---|---|---|
| | Elastic polymer Isobutylene: IB Isoprene: IP Divinylbenzene: DB (100 parts by weight) | Magnesium oxide (parts by weight) | Vulcanizing agent, crosslinking agent Peroxide: PO Resin: RE (parts by weight) | Solvent γ-butyrolactone | Electrolyte Carboxylate of quaternary matter of a compound having N,N,N'-substitute amidine group: NA Quaternary ammonium salt of of carboxylic acid: AS | Number of samples having leak out of 10 samples each after application of −1.5 V for 2000 hours at 60° C., 90% RH (pieces) |
| Embodiment 1 | IB-IP-DB | 0.5 | PO:3 | Contained | NA | 1 |
| Embodiment 2 | IB-IP-DB | 1 | PO:3 | Contained | NA | 0 |
| Embodiment 3 | IB-IP-DB | 3 | PO:3 | Contained | NA | 0 |
| Embodiment 4 | IB-IP-DB | 4 | PO:3 | Contained | NA | 0 |
| Embodiment 5 | IB-IP-DB | 5 | PO:3 | Contained | NA | 0 |
| Embodiment 6 | IB-IP-DB | 10 | PO:3 | Contained | NA | 0 |
| Embodiment 7 | IB-IP-DB | 20 | PO:3 | Contained | NA | 0 |
| Embodiment 8 | IB-IP | 4 | RE:5 | Contained | NA | 0 |
| Embodiment 9 | IB-IP-DB | 4 | RE:5 | Contained | NA | 0 |
| Embodiment 10 | IB-IP | 1 | PO:3 | Contained | NA | 0 |
| Embodiment 11 | IB-IP | 10 | PO:3 | Contained | NA | 0 |
| Embodiment 12 | IB-IP-DB | 1 | PO:0.1 | Contained | NA | 0 |
| Embodiment 13 | IB-IP-DB | 6 | RE:10 | Contained | NA | 0 |
| Embodiment 14 | IB-IP | 1 | PO:0.1 | Contained | NA | 0 |
| Embodiment 15 | IB-IP | 6 | RE:10 | Contained | NA | 0 |
| Embodiment 16 | IB-IP | 10 | PO:3 | Contained | NA | 0 |
| Embodiment 17 | IB-IP | 0.5 | PO:3 | Contained | NA | 1 |
| Embodiment 18 | IB-IP | 20 | PO:3 | Contained | NA | 0 |

TABLE 2

| Sample | Composition of sealing member | | | Electrolyte solution | | Test result |
|---|---|---|---|---|---|---|
| | Elastic polymer Isobutylene: IB Isoprene: IP Divinylbenzene: DB (100 parts by weight) | Magnesium oxide (parts by weight) | Vulcanizing agent, crosslinking agent Peroxide: PO Resin: RE (parts by weight) | Solvent γ-butyrolactone | Electrolyte Carboxylate of quaternary matter of a compound having N,N,N'-substitute amidine group: NA Quaternary ammonium salt of of carboxylic acid: AS | Number of samples having leak out of 10 samples each after application of −1.5 V for 2000 hours at 60° C., 90% RH (pieces) |
| Comparative example 1 | IB-IP-DB | 0 | PO:3 | Contained | AS | 10 |
| Comparative example 2 | IB-IP-DB | 4 | PO:3 | Contained | AS | 3 |
| Comparative example 3 | IB-IP | 0 | RE:5 | Contained | AS | 4 |
| Comparative example 4 | IB-IP | 4 | RE:5 | Contained | AS | 3 |
| Comparative example 5 | IB-IP-DB | 0 | RE:5 | Contained | AS | 4 |
| Comparative example 6 | IB-IP-DB | 4 | RE:5 | Contained | AS | 3 |
| Comparative example 7 | IB-IP | 0 | PO:3 | Contained | AS | 10 |
| Comparative example 8 | IB-IP | 10 | PO:3 | Contained | AS | 4 |
| Comparative example 9 | IB-IP-DB | 0 | RE:10 | Contained | AS | 7 |
| Comparative example 10 | IB-IP-DB | 6 | RE:10 | Contained | AS | 5 |

TABLE 3

| Elastic polymer Isobutylene: IB Isoprene: IP Divinyl benzene: DB (100 parts by weight) | Magnesium oxide (parts by weight) | Vulcanizing agent, crosslinking agent Peroxide: PO Resin: RE (parts by weight) | Tensile strength of crosslinked composite material | Elongation of crosslinked composite material |
|---|---|---|---|---|
| IB-IP-DB | 0 | PO:3 | 526 | 159 |
| IB-IP-DB | 0.5 | PO:3 | 486 | 163 |
| IB-IP-DB | 1 | PO:3 | 445 | 170 |
| IB-IP-DB | 3 | PO:3 | 489 | 172 |
| IB-IP-DB | 4 | PO:3 | 525 | 161 |
| IB-IP-DB | 5 | PO:3 | 506 | 157 |
| IB-IP-DB | 10 | PO:3 | 540 | 157 |
| IB-IP-DB | 20 | PO:3 | 543 | 121 |

As understood from the measured results of embodiment 1 to embodiment 18 in Table 1, in the electrolytic capacitors comprising the sealing member using a composite material containing magnesium oxide in the elastic polymer, and carboxylate of quaternary matter of a compound having N, N, N'-substitute amidine group as electrolyte, the number of samples causing electrolyte leak was one or less in 10 samples each, and the rate of electrolyte leak was low. In particular, all electrolytic capacitors having the sealing member containing magnesium oxide by 1 part by weight or more were completely free from electrolyte leak.

By contrast, as known from the measured results of comparative examples, in the electrolytic capacitors comprising the sealing member using a composite material not containing magnesium oxide, and carboxylate of quaternary matter of a compound having N, N, N'-substitute amidine group as electrolyte, electrolyte leak was found in three or more samples in 10 samples each.

Further, as known from the measured results of comparative example 1 to comparative example 10 in Table 2, in the electrolytic capacitors containing quaternary ammonium salt of carboxylic acid instead of carboxylate of quaternary matter of a compound having N, N, N'-substitute amidine group as electrolyte solution, electrolyte leak was found in three or more samples in 10 samples each. Besides, in the electrolytic capacitors comprising electrolyte solution containing quaternary ammonium salt of carboxylic acid instead of carboxylate of quaternary matter of a compound having N, N, N'-substitute amidine group, and a sealing member containing magnesium oxide, electrolyte leak was found in three or more samples in 10 samples each. Electrolyte leaks from the electrolytic capacitors occurred from around the through-holes of the lead wires.

Thus, in the electrolytic capacitors comprising both electrolyte solution containing carboxylate of quaternary matter of a compound having N, N, N'-substitute amidine group, and a sealing member using a composite material containing magnesium oxide, no electrolyte leak was found at all. That is, the aluminum electrolytic capacitors comprising both sealing member fabricated from a composite material containing elastic polymer and magnesium oxide disposed in the elastic polymer, and electrolyte solution containing salt of quaternary matter of a compound having N, N, N'-substitute amidine group and oxide, leak of electrolyte solution is prevented in the atmosphere of high temperature and high humidity.

Also as understood from Table 3, in the composite material containing magnesium oxide by more than 20 parts by weight, the elongation is about 30% smaller. This cause is estimated that magnesium oxide promotes progress of crosslinking of the crosslinked composite material.

As shown in FIG. 2, the permeation amount of the solvent is decreased along with increase of the blending rate of magnesium oxide. From this result it is confirmed that magnesium oxide increases the crosslinking density of elastic polymer material, and further has a large effect as a filler.

As known from the results of experiments in Table 1, Table 2, Table 3, and FIG. 2, in 100 parts by weight of elastic polymer, it is particularly preferred to use the sealing member containing magnesium oxide in a range of about 1 part by weight to about 10 parts by weight.

As clear from FIG. 3, the aqueous solution of quaternary salt of a compound having amidine group is smaller in the permeation amount into the composite material than the aqueous solution of quaternary ammonium salt of an organic acid. It is hence estimated that the quaternary salt of a compound having amidine group suppresses deterioration of the composite material. Accordingly, the electrolytic capacitor using quaternary salt of a compound having amidine group as the electrolyte is free from both deterioration of sealing member and electrolyte leak. Further, the effects are notably enhanced by the use of the sealing member containing magnesium oxide.

Incidentally, in comparison between an aqueous solution of quaternary salt of a compound having amidine group of an equivalent mole number, and an aqueous solution of quaternary ammonium salt of an organic acid, the pH of the aqueous solution of quaternary salt of a compound having amidine group was 12, while the pH of the aqueous solution of quaternary ammonium salt of an organic acid was 14. It is hence estimated that the quaternary salt of a compound having amidine group suppresses the alkalization. That is, as the electrolyte solution, it is preferred to use an electrolyte solution of which pH becomes 13 or less when electrolyzed. The electrolytic capacitor comprising a sealing member having excellent heat resistance, air tightness, and chemical resistance, and an electrolyte solution of which pH is 13 or less when electrolyzed can prevent leak of electrolyte solution even in severe conditions of high temperature and high humidity.

Thus, according to the constitution of the invention, even in severe conditions of high temperature and high humidity, leak of electrolyte solution can be prevented. As a result, an aluminum electrolytic capacity of long life and high reliability is obtained.

What is claimed is:

1. An electrolytic capacitor comprising:
   an electrolyte solution,
   a capacitor element impregnating said electrolyte solution, a case containing said capacitor element, a sealing member sealing an opening of said case, and lead wires coming out from said capacitor element and projecting outside by penetrating through said sealing member, wherein said sealing member is fabricated of a composite material containing elastic polymer and magnesium oxide dispersed in said elastic polymer, and said electrolyte solution contains a salt of quaternary matter of a compound containing N, N, N'-substitute amidine group and acid compound.

2. The electrolytic aluminum capacitor of claim 1, wherein said electrolyte solution has γ-butyrolactone as solvent, and said salt is dissolved in said solvent.

3. The electrolytic aluminum capacitor of claim 1, wherein said elastic polymer has a crosslinkable elastic polymer material, and said sealing member is a composite material formed by crosslinking reaction of a mixed material composed of 100 parts by weight of said crosslinkable elastic polymer material, 50 to 200 parts by weight of filler, 10 to 80 parts by weight of carbon black, 0.1 to 10 parts by weight of vulcanizing agent, and 1 to 10 parts by weight of magnesium oxide.

4. The electrolytic aluminum capacitor of claim 1, wherein said elastic polymer has a three-component copolymer of isobutylene, isoprene and divinyl benzene.

5. The electrolytic aluminum capacitor of claim 1, wherein said elastic polymer has a copolymer of isobutylene and isoprene.

6. The electrolytic aluminum capacitor of claim 1, wherein said electrolyte solution has γ-butyrolactone as solvent, said salt is dissolved in said solvent, said elastic polymer has a crosslinkable elastic polymer material, and said sealing member is the composite material formed by crosslinking reaction of a mixed material composed of 100 parts by weight of said crosslinkable elastic polymer material, 50 to 200 parts by weight of filler, 10 to 80 parts by weight of carbon black, 0.1 to 10 parts by weight of vulcanizing agent, and 1 to 10 parts by weight of magnesium oxide.

7. The electrolytic aluminum capacitor of claim 1, wherein said sealing member further contains at least one material selected from the group consisting of reinforcing agent; filler, crosslinking aid, processing aid, and aging retardant.

8. The electrolytic aluminum capacitor of claim 1, wherein said elastic polymer has a crosslinkable elastic polymer material, and said sealing member has a composite material formed by crosslinking reaction of said crosslinkable elastic polymer material and a peroxide crosslinking agent.

9. The electrolytic aluminum capacitor of claim 1, wherein said elastic polymer has a crosslinkable elastic polymer material, and said sealing member has the composite material formed by crosslinking reaction of said crosslinkable elastic polymer material and a resin crosslinking agent.

10. The electrolytic aluminum capacitor of claim 1, wherein said elastic polymer has a crosslinkable elastic polymer material, and said sealing member has the composite material formed by crosslinking reaction of a mixed material containing said crosslinkable elastic polymer material, a crosslinking agent, and magnesium oxide.

11. The electrolytic aluminum capacitor of claim 1, wherein said case has a tubular shape with a bottom, and said opening is formed at one side of said case.

12. The electrolytic aluminum capacitor of claim 1, wherein said electrolyte solution has pH of 13 or less when electrolyzed.

13. The electrolytic aluminum capacitor of claim 1, wherein said quaternary matter of a compound containing N, N, N'-substitute amidine group is at least one selected from the group consisting of methyl imidazole, dimethyl imidazole, dimethyl-ethyl imidazole, methyl benzoimidazole, dimethyl imidazoline, trimethyl imidazoline, dimethyl-ethyl imidazoline, dimethyl-tetrahydropyrimidine, diazabicyclo-undecene, and diazabicyclononene.

14. The electrolytic aluminum capacitor of claim 1, wherein said acid compound contains at least one selected from the group consisting of carboxylic acid, phosphoric acid, and ester alkyl phosphate.

* * * * *